United States Patent
Carpenter et al.

(10) Patent No.: US 7,903,433 B2
(45) Date of Patent: Mar. 8, 2011

(54) CURRENT BALANCING FOR MULTI-PHASE CONVERTERS

(75) Inventors: Brian A. Carpenter, Cary, NC (US); Christopher J. Sanzo, Providence, RI (US); Biranchinath Sahu, Bangalore (IN); Tetsuo Tateishi, Aichi (JP)

(73) Assignee: Texas Instruments Incorporated, Dallas, TX (US)

( * ) Notice: Subject to any disclaimer, the term of this patent is extended or adjusted under 35 U.S.C. 154(b) by 284 days.

(21) Appl. No.: 11/964,410

(22) Filed: Dec. 26, 2007

(65) Prior Publication Data

US 2009/0167080 A1   Jul. 2, 2009

(51) Int. Cl.
*H02M 3/335* (2006.01)

(52) U.S. Cl. .......................................... 363/16

(58) Field of Classification Search ............ 323/222, 323/223, 225, 265, 268, 271, 282, 285; 363/16, 363/21.09, 21.1, 71
See application file for complete search history.

(56) References Cited

U.S. PATENT DOCUMENTS

| | | | |
|---|---|---|---|
| 6,246,222 B1 * | 6/2001 | Nilles et al. | 323/283 |
| 6,977,489 B2 * | 12/2005 | Isham | 323/272 |
| 7,268,527 B2 * | 9/2007 | Horner | 323/285 |
| 7,339,361 B2 * | 3/2008 | Dong et al. | 323/285 |
| 2007/0273342 A1 * | 11/2007 | Kataoka et al. | 323/234 |
| 2009/0167080 A1 * | 7/2009 | Carpenter et al. | 307/14 |

* cited by examiner

*Primary Examiner* — Adolf Berhane
*Assistant Examiner* — Yemane Mehari
(74) *Attorney, Agent, or Firm* — William B. Kempler; Wade J. Brady, III; Frederick J. Telecky, Jr.

(57) ABSTRACT

A converter for a multi-phase current network can include a plurality of current sensors, each of the plurality of current sensors being configured to detect current for a respective phase of the multi-phase network. A current averaging circuit is configured to provide an indication of the average current for the multi-phase network based on the current detected by each of the plurality of current sensors. A modulator is configured to modulate at least one phase of the multi-phase network independently of each other phase of the multi-phase network based on a difference between the current detected for the at least one phase and the average current for the multi-phase network.

15 Claims, 4 Drawing Sheets

CURRENT BALANCING FOR MULTI-PHASE CONVERTERS

TECHNICAL FIELD

This invention relates to electronics, and more specifically to current balancing for multiphase converters.

BACKGROUND

As mobile and personal electronic devices power requirements increase, the problems associated with supplying power to the devices have been solved by balancing multiple current phases switched out-of-phase in order to provide the required load current. One factor influencing the success of multi-phase converters is the ability to balance the load current between phases. Without current balancing, one of the phases will carry more current than the others, potentially resulting in thermal and system overload problems.

Typically, traditional pulse width modulated (PWM) current mode converters are used as a balancing solution for various applications. Constant on-time converters have also been used, for example in notebook applications because they typically provide better transient response than traditional PWM converters, resulting in smaller, more economical systems for the customer. However, constant on-time converters typically require complex algorithms and calculations to be programmed by a designer its intended application.

SUMMARY

One embodiment of the present invention includes a converter for a multi-phase current network can include a plurality of current sensors, each of the plurality of current sensors being configured to detect current for a respective phase of the multi-phase network. A current averaging circuit is configured to provide an indication of the average current for the multi-phase network based on the current detected by each of the plurality of current sensors. A modulator is configured to modulate at least one phase of the multi-phase network independently of each other phase of the multi-phase network based on a difference between the current detected for the at least one phase and the average current for the multi-phase network.

Another embodiment of the present invention includes a converter for balancing current among different channels of a multi-phase network. The converter includes a first current sensor for sensing current through an inductor of a first phase of the multi-phase network and for providing a first current signal representing the current through the inductor of the first phase and a second sensor for sensing current through an inductor of a second phase of the multi-phase network and for providing a second current signal representing the current through the inductor of the second phase. A first current sharing amplifier provides a scaled output that is proportional to a difference between an average current for the multi-phase network and the current through the inductor of the first phase. A second current sharing amplifier provides a scaled output that is proportional to a difference between an average current for the multi-phase network and the current through the inductor of the second phase. A modulator independently modulates an ON-time for each of first and second phases of the multi-phase network based on the scaled output provided by the first current sharing amplifier and the scaled output provided by the second current sharing amplifier.

Yet another embodiment of the present invention includes a converter for a multi-phase current network that includes a plurality of current sensing amplifiers, each of the plurality of current sensing amplifiers being configured to provide a sensor output signal that represents current through an inductor of a respective phase of the multi-phase network. The converter also includes a plurality of current sharing amplifiers, each of the plurality of current sharing amplifiers for a given phase being configured to provide shared current output signal that is proportional to a difference between a determined average current for the multi-phase network and the current through the inductor of the given phase. At least one modulator is configured to modulate at least one phase of the multi-phase network independently of each other phase of the multi-phase network based on a difference between the current detected for the at least one phase and the average current for the multi-phase network.

DETAILED DESCRIPTION

This invention relates to electronics, and more specifically to a system and method to balance current in a multiphase converter. As one example, such a multi-phase converter system includes a balancing circuit that can balance the current in the different phases by modulating the current in at least one of a plurality of phases independently. As used herein, current balancing can mean an adjustment to achieve equal balance (e.g., equalized current) or it can be employed to achieve other proportional relationships among the phases. The modulation can be implemented by individually modulating such phase (or phases) based on a difference between the current detected for each such phase relative to an average of the current for the entire multi-phase network. To achieve this functionality, the system can include a current sensor configured to sense current for each phase and an averaging circuit that determines the average current for the multi-phase network. The modulator can in turn modulate one or more of the phases independently, thereby eliminating the need for complex calculations or algorithms required in existing types of multi-phase converters.

Figure 1:
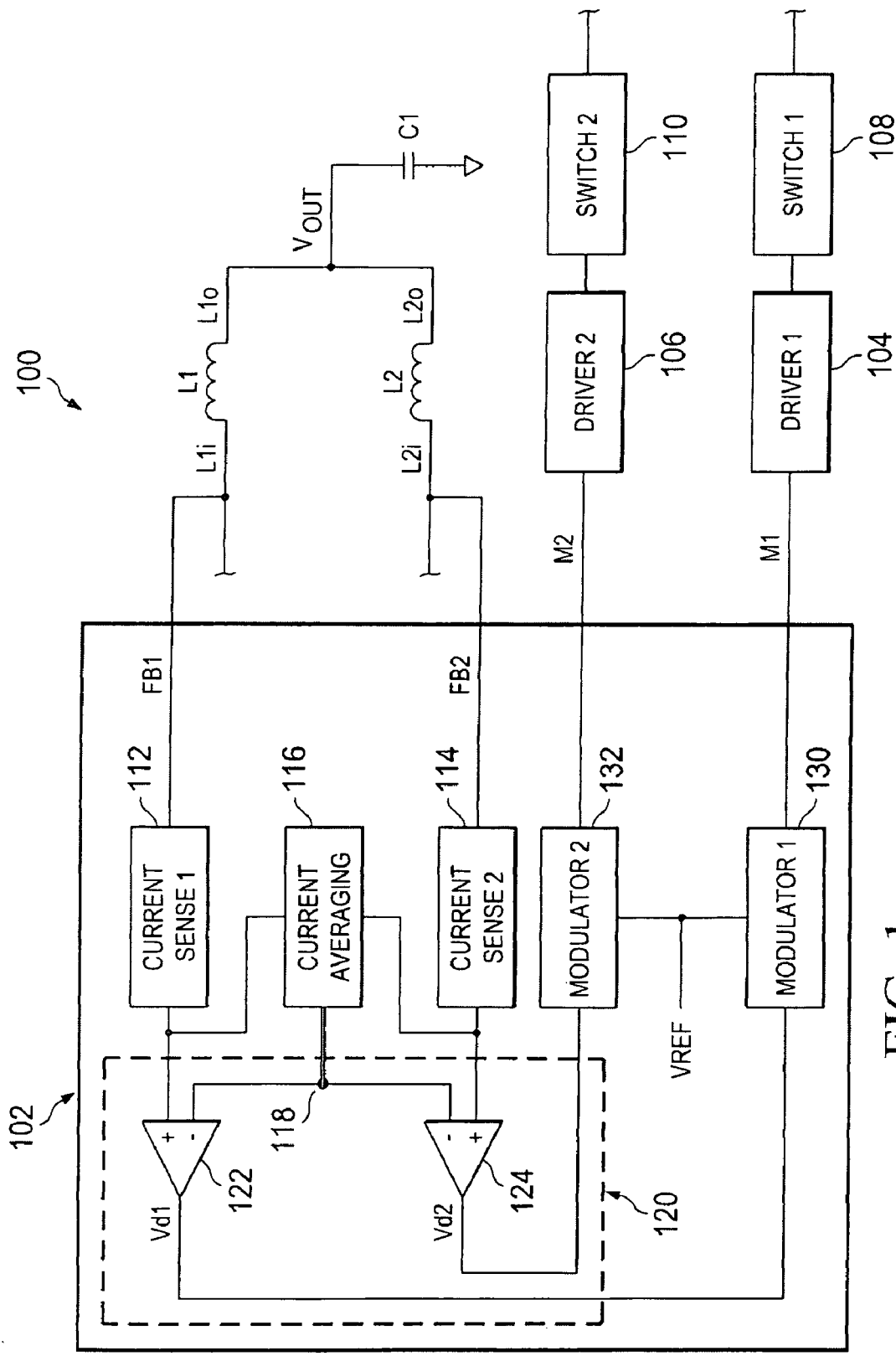
FIG. 1 illustrates an example of a current sharing system constructed in accordance with an aspect of the invention.

FIG. 1 depicts an example embodiment illustrating a multiphase current sharing system 100. The multiphase current sharing system 100 includes a current balancing converter, which can be implemented in whole or partially in an integrated circuit (IC) 102. In the example of FIG. 1, the IC 102 is coupled to external circuitry located outside of the IC. The external circuitry can include two or more drivers 104 and 106 of the multiphase system that receive modulated outputs M1 and M2 from the current balancing converter. The converter IC 102 provides a modulated output M1, M2 for each channel (e.g., channel 1, channel 2) to an input side of respective external drivers 104, 106. While only two channels are shown, the converter IC 102 is capable of supporting any number of current channels or phases. Each of the drivers 104, 106 are coupled on their respective output side to drive a respective switch, schematically depicted at 108, 110. The drivers selectively activate the switches 108 and 110 to provide a corresponding output current to inductors L1 and L2. The inductors L1 and L2 are connected in parallel to a capacitor C1. The capacitor C1 is connected between a junction on output sides L1o and L2o of the inductors L1, L2 and ground. The junction between the capacitor C1 and inductors L1, L2 provides an output signal $V_{OUT}$ with a constant current to be provided across several sources.

While the example of FIG. 1 demonstrates certain circuitry as being implemented in the converter IC and other circuitry as being external to the IC, it will be understood that the invention herein contemplates different levels of integration. For example, any of the circuitry, including the drivers 104 and 106, the switch devices 108 and 110 can be implemented in the IC 102. Additionally or alternatively, the inductors L1 and L2 may also be integrated into the same IC package as the other components of the converter. Thus, those skilled in the art will appreciate various levels of integration that can be achieved according to an aspect of the invention. Additionally, the current balancing approach described herein is applicable to balancing phases for other types of output systems. For example, the converter can be configured to balance the load current or voltage for a multi-phase charge pump (which may include no inductors).

An indication of phase current through each of the inductors L1 and L2 can be provided as feedback to the converter IC 102, which feedback is indicated at FB1 and FB2. As one example, a current sensor 112, 114 can be coupled to detect the phase current and provide a current sensor output signal with a value (e.g., a voltage) that represents the sensed phase current. The current sensors 112 and 114 could be any known method or construction of circuitry configured for current sensing. In one embodiment, the current sensors can be implemented as current sense amplifiers having a gain set to provide an output voltage indicative of the sensed phase current. Other examples for current sensing in the analog domain include amplifying voltage across a current sense resistor, a hall effect device, MOSFET RDS(on), inductor direct current resistance (DCR), and the like. Each of these devices The converter IC 102 also includes a current averaging circuit 116 configured to determine an average phase current for the multi-phase network. In the example of FIG. 1, the current averaging circuit 116 includes inputs coupled to receive an output from each current sensor 112, 114, and accordingly averages the current according to the phase current sensed for each respective channel. The current averaging circuit 116 provides an output signal 118 having a value corresponding to the average current that is provided to the plurality of phases. The average current output signal 118 and the current sensor output signals for each phase are provided to a phase control/equalization circuit 120. The phase control/equalization circuit 120 is configured to adjust phase current through at least one and suitably each of the channels as a function of the average phase current (indicated by output 118) and the indication of the phase currents provided by the current sensors 112 and 114. As described herein, for example, the phase control/equalization circuit 120 can generate reference signals for each phase based on a difference between the current detected for each phase relative to the average current for the entire multi-phase network.

In the example of FIG. 1, the output signal 118 can be provided to the inverting input of first and second current share amplifiers 122 and 124, respectively. The output of current sensor 112 is coupled to the non-inverting input of amplifier 122, and the output of current sensor 114 is coupled to the non-inverting input of amplifier 124. The gain amplifiers, 122 and 124 can be implemented as analog summation circuits. The gain amplifiers 122 and 124 each is configured with a gain so that each amplifier provides a respective output signal Vd1 and Vd2 having a value that represents the gain multiplied by the difference between the phase current and the average current.

Modulators 130 and 132 each receive the same system reference VREF for output voltage control. The modulators 130 and 132 also receive respective input signals Vd1 and Vd2. The modulators 130 and 132 are configured to adjust the pulse width of each respective phase by using Vd1 and Vd2 to equalize the current of each channel. Each modulator 130, 132 provides a corresponding modulator output signal M1 and M2 to respective phase drivers 104 and 106 for controlling output switch devices 108 and 110. The modulators 130 and 132 can be any type of current modulator, such as pulse width modulators, constant on-time modulators, frequency modulators, and the like, for providing respective modulated signals to the drivers 104 and 106, respectively.

The construction of the converter IC 102 illustrated in FIG. 1 provides all summing and differentiating operations as analog circuitry internal to the IC, eliminating the need for complex calculation required in conventional converters. The size and costs of the converter is also advantageously reduced. Further, the speed of the current sharing is increased as a result of the converter IC 102 construction. Although two share loops work in tandem to equalize the current in two-phases in the system, from feedback loop operation perspective each can be treated separately.

By way of example, let $A_{SH}(S)$ and $A_{CS}(s)$ represent the DC gain for each of the share amplifiers 122, 124 and the current-sense amplifier 112, 114, respectively. The small-signal open-loop transfer function of the feedback loop provides insight that can help with the design of the share amplifier and its compensation circuit. For loop analysis, nonlinear elements in the loop can be represented by their time-averaged, linearized models. The open loop transfer function of the system can be given by:

$$LG(s) = \left(\frac{A_{SH0}}{1+\frac{s}{p_{SH}}}\right)\left(\frac{A_{CS0}}{1+\frac{s}{p_{CS}}}\right)\left(\frac{\frac{R_S}{R_S+R_P}}{1+\frac{s}{L/(R_S+R_P)}}\right)$$

where: $R_s$ is the resistance of a current sense resistor in series with the inductors L1 and L2;
$R_p$ is the phase resistance for the respective loop;
$P_{SH}$ represents the pole associated with the current share amplifiers 122, 124;
$p_{CS}$ represents the pole associated with the current sense amplifiers 112, 114; and
L is the phase inductance.

Figure 2:
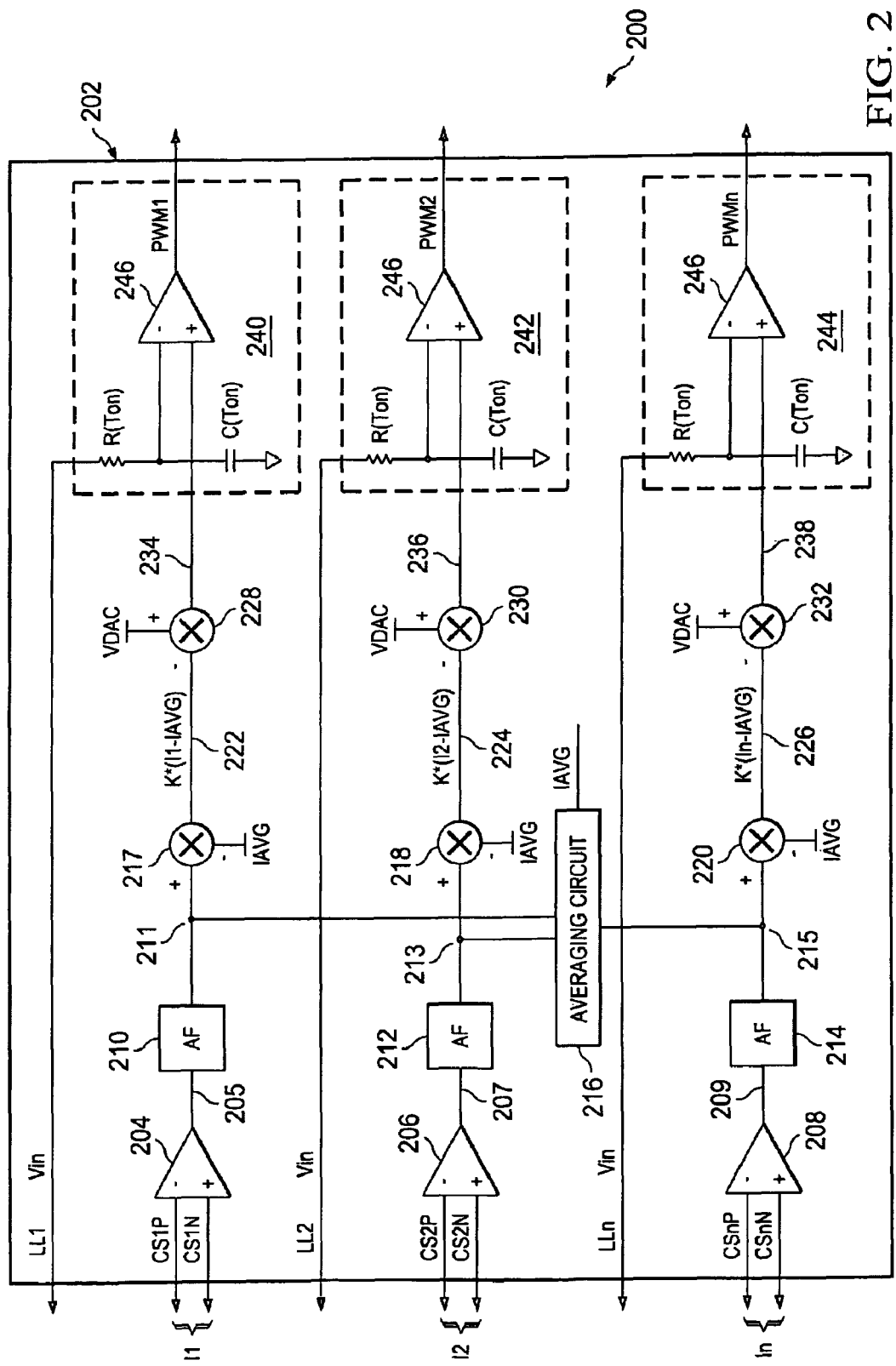
FIG. 2 illustrates an example of a current sharing converter constructed in accordance with an aspect of the invention.

Illustrated in FIG. 2 is another example embodiment of a multiphase current balancing system 200 according to an aspect of the invention. The system 200 includes a plurality of channels I1, I2, and In (where n is a positive integer denoting the number of channels) representing multiple current phases. The converter IC 202 includes a corresponding current sensing amplifier 204, 206, and 208 that receives a signal from each channel, namely CS1, CS2, and CSn, respectively. The amplifiers 204, 206, and 208 provide an output signal 205, 207, and 209 indicative of the phase current for each channel. The output signals 205, 207, 209 are received as inputs side by a respective averaging filter 210, 212, and 214. The averaging filters 210, 212, and 214 can be any type of filter and may vary in size based on the given frequency in a particular channel. In one example embodiment, the averaging filters 210, 212, and 214 are resistance/capacitance (RC) filters having a desired time constant. For instance, the averaging filters can be 5 µS filters. Each of the averaging filters 210, 212, and 214, provides respective filtered (e.g. delayed) signals 211, 213, and 215 to an input of a current averaging circuit 216. The current averaging circuit 216 averages the current received from the output of each channel averaging filter. As one example, the current averaging circuit 216 sums the current valves sensed for each channel, namely I1, I2, and In to acquire a total summed current and divides the total summed current by the total number of channels, namely n. The quotient resulting from the division of the total number of channels n into the total summed current becomes an output signal IAVG. The output signal IAVG is further illustrated in Equation (A).

$$IAVG = \frac{I1 + I2 + \ldots In}{n} \quad \text{Equation (A)}$$

Also located within the converter IC 202 are differential elements 217, 218, and 220 that receive the IAVG signal from the current averaging circuit 216 at a minus input on each differential element. The differential elements 217, 218, and 220 further receive the output signals 211, 213, and 215 from their respective averaging filters 210, 212, and 214 at a plus input on each differential. Each differential element 217, 218, and 220 produces a respective output signal 222, 224, and 226 being the difference between the current of the respective channel I1, I2, and In from output signal IAVG. The differential elements 217, 218 and 220 multiply a gain factor K by the difference between the phase current and the average current signals to provide corresponding output signals 222, 224, and 226 for scaling the current sharing. The gain factor K may be the same for each channel or different gain factors can be used for different channels. The differential elements 217, 218 and 220 provide the resulting output signals 222, 224, and 226 to an inverting input of a respective summer 228, 230 and 232 for each channel. The summers 228, 230, and 232 also receive at a positive input a VDAC signal. The summers 228, 230 and 232 compare the VDAC signal relative to the summation output signals 222, 224, and 226 (e.g., by subtracting the signals from VDAC) to provide phase control signals 234, 236, and 238. The phase control signals 234, 236 and 238 correspond to reference signals that can be employed to perform modulation for equalizing current in each of the respective phases.

In the example of FIG. 2, each of the summer output signals 234, 236, and 238 are coupled to a respective constant on-time modulator 240, 242, and 244, respectively. The modulators 240, 242, and 244 can reside internal to the converter IC 202. For example, each of the on-time modulators 240, 242, and 244 includes a resistor R, capacitor C, and amplifier 246. A feedback loop is provided through phase nodes LL1, LL2, and LLn for each channel. By way of further example, a PWM comparator (not shown) starts the pulse for each phase or channel and provides a voltage Vin that passes through the resistor R to charge capacitor C for each channel according to the RC time constant provided by the resistor and capacitor. When the voltage charge at the capacitor C reaches a voltage equal to the summer output signal 234, 236, 238, the pulse is turned off for that particular channel, allowing current sharing to different devices through the amplifier 246. The amplifier 246 of each modulator 240, 242, and 244 thus generates respective PWM1, PWM2, and PWMn outputs based on the respective input voltage at the inverting input thereof relative to the respective summer output signals 234, 236 and 238. In addition to providing a current sharing source to various devices and drivers, the outputs PWM1, PWM2, and PWMn can provide a pulse width modulated signal to phase nodes LL1, LL2, and LLn for each respective channel.

Figure 3:
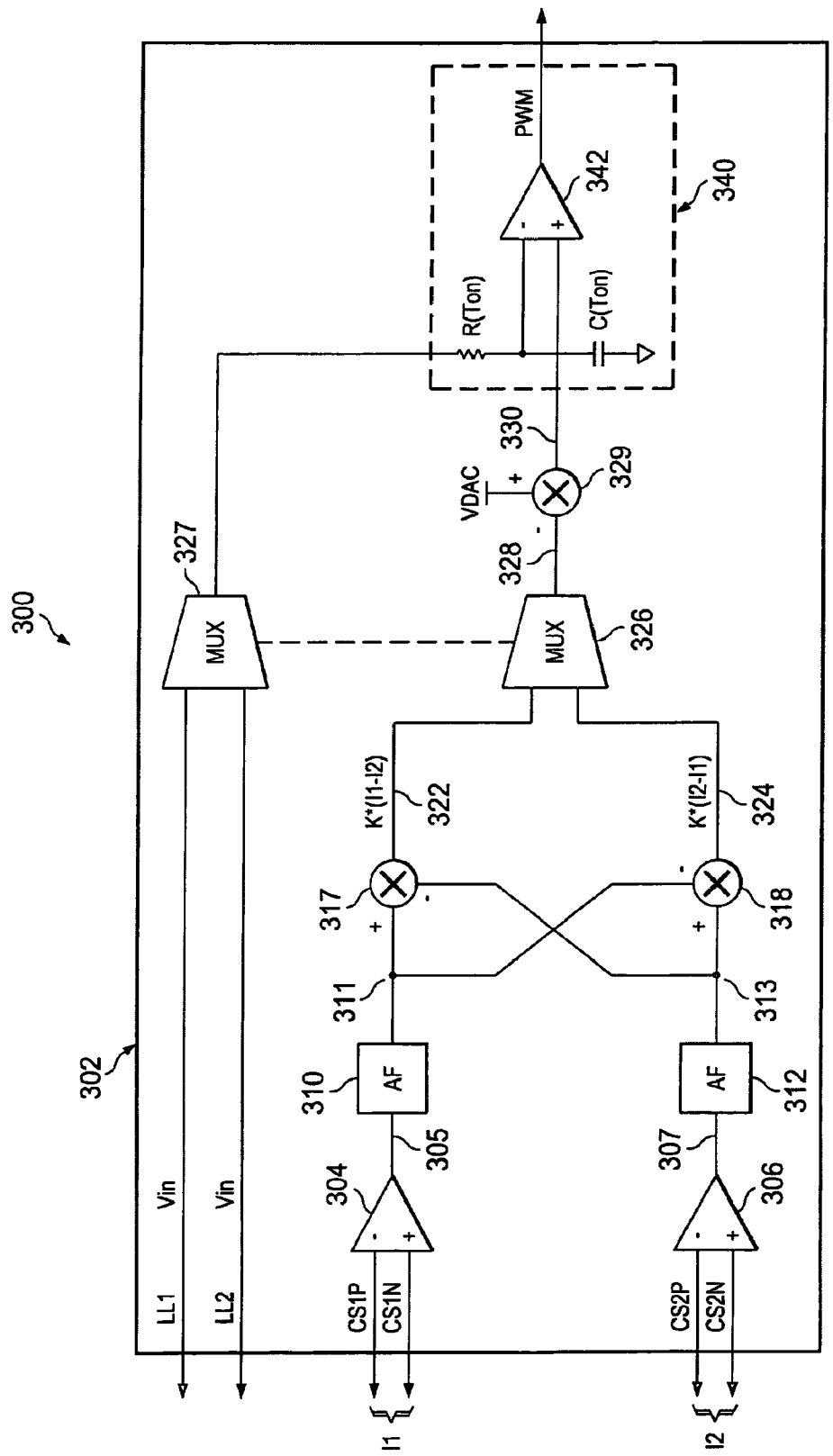
FIG. 3 illustrates yet another example of a current sharing converter constructed in accordance with an aspect of the invention.

FIG. 3 depicts another example embodiment of a multi-phase current converter system 300, having dual channels I1 and I2. The system includes a converter IC 302 that contains the analog circuitry configured to perform current balancing according to an aspect of the invention. The converter IC 302 includes corresponding current sensing amplifiers 304 and 306 that receive a signal for each channel, namely CS 1 and CS2, respectively, which signal is proportional to phase current. The amplifiers 304 and 306 provide an output 305 and 307 having a value (e.g., an analog voltage) indicative of the phase current for each channel. The output signals 305 and 307 are received on an input side of a respective averaging filter 310 and 312. The averaging filters 310 and 312 can be any type of filter and may vary in size based on the given frequency of a channel. In one example embodiment, the averaging filters 310 and 312 are implemented as resistance/capacitance (RC) networks having a time constant selected to provide a time averaged indication of the detected phase current. Each of the averaging filters 310 and 312 provides a respective output signal 311 and 313 to a negative input of summation blocks 318 and 317, respectively located on an opposite channel. The output signals 311 and 313 also are coupled to a positive input to the summation blocks 317 and 318, respectively on the same channel as the averaging filter. The summation blocks 317 and 318 can be implemented as a differential amplifier having a gain factor (k) configured to perform an averaging of the detected phase currents, which gain can vary depending on the number of channels. The summation blocks 317 and 318 produce an averaged output signal, being a weighted (e.g., multiplied by gain factor K) difference between the phases for each channel, namely output signal 322 for channel I1 (e.g., corresponding to K*(I1−I2)) and output signal 324 for channel I2 (e.g., corresponding to K*(I2−I1)). The gain factor K can be set according to the number of channels so that the output signals each represents a scaled difference between the average phase current and the individual phase current. That is, each of the summation blocks 317 and 318 define current share amplifiers that provide a scaled output having a value that is proportional to the difference between the current detected for each respective phase and the average current for the multi-phase network. As mentioned above, in this two phase system 300, the current share amplifiers (summation blocks 317 and 318) are configured to also determine the average system phase current. As a result, separate averaging circuitry can be omitted from the design and the system 300 can be manufactured at reduced cost.

A first multiplexer 326 receives the output signals 322 and 324 and is controlled by a selection signal to provide one of the output signals according to which of the phase currents is to be modulated during a given part of an operating cycle.

The multiplexer 326 provides a selected output signal 328 (corresponding to one of the signals 322 or 324) to a negative input of summer 330. A reference VDAC signal is also provided to positive input of the summer 330. The summer 330 compares the selected output signal 328 relative to VDAC (e.g., by subtracting the output signal from VDAC) to provide a corresponding output signal 330. The variations on the output signal 330 are further demonstrated with reference to FIG. 4.

The difference output signal 330 is provided to a modulator, such as an on-time modulator 340 that is internal to the converter IC 302. In the example of FIG. 3, the on-time modulator 340 includes a resistor R, capacitor C and amplifier 342. The node between the resistor R and the capacitor C is coupled to the inverting input of the differential amplifier 340. The difference output signal 330 is provided to a non-inverting input of the differential amplifier 342. A feedback loop is provided through phase nodes LL1 and LL2 for each channel, namely, I1 and I2 respectively. As an example, PWM comparator (not shown) starts the pulse for each current phase or channel and provides a voltage Vin that is received by a second multiplexer 327. The second multiplexer 327 is synchronized with the first multiplexer 326, such that the Vin signal for the respective channel is selected provided to charge the capacitor through the resistor R of the modulator 340. When the capacitor C charges to provide a voltage at the inverting input of the amplifier 342 equal to the difference output signal at 330, the PWM output pulse is turned off for that particular channel, which allows current sharing to different devices for another channel through respective through the amplifier 342 to a PWM output. Additionally, switching circuitry (e.g., a de-multiplexer, not shown) can also be provided at the output of amplifier 342 for routing the PWM output to a driver (High-side and Low-side FETs) for the selected phase. The operation of such de-multiplexer for routing the PWM output signal can be synchronized with the operation of the multiplexers 326 and 327. In addition to providing a current sharing source to various devices and drivers, the output PWM provides a pulse width to phase nodes LL1 and LL2 for each respective channel.

It will be appreciated by those skilled in that art that the dual channel implementation of FIG. 3 affords the advantage over other numbers of phases by eliminating the need for a separate averaging circuit to determine the aggregate average phase current for the system 300. That is, in the example of FIG. 3, the circuitry for determining a system average phase current is integrated into each phase's current balancing circuitry 317 and 318. Thus, by eliminating a separate current averaging circuit, the system 300 can be manufactured at a reduced cost relative to other comparable systems. While the example of FIG. 3 depicts a multiplexed single modulator 340, it will be understood that separate modulators could be provided for each phase similar to as shown and described with respect to the examples of FIGS. 1 and 2. Conversely, the multiplexed modulator approach of FIG. 3 can also be utilized in the systems of FIGS. 1 and 2.

Figure 4:
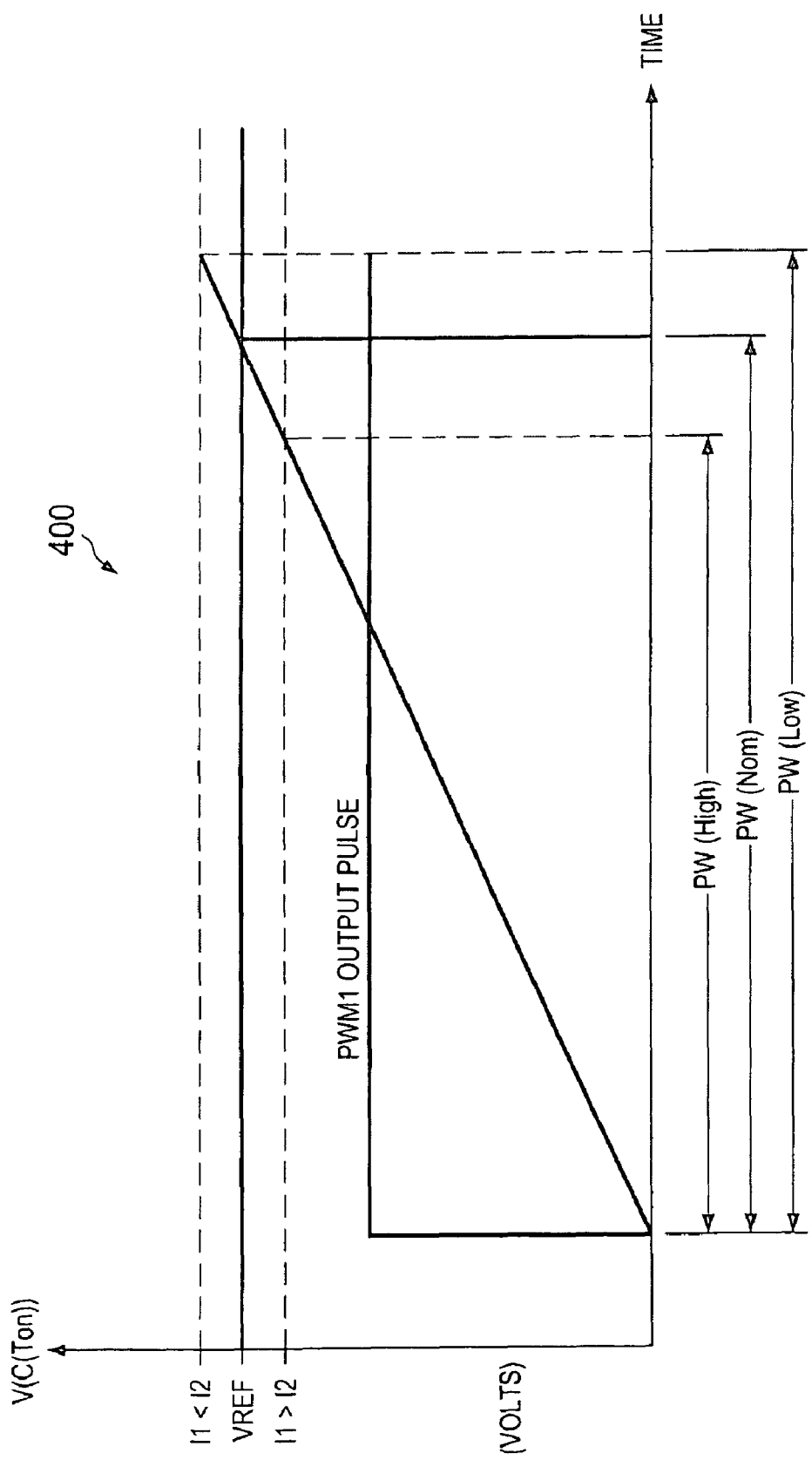
FIG. 4 is a graphical illustration of a timing diagram showing deviation from a normal pulse width for the current sharing systems of the invention.

FIG. 4 is a timing diagram showing deviation from a nominal pulse width for the current sharing systems of the invention. If the phase current in different channels are equal, namely I1=I2, then the PWM modulator of the current sharing system terminates when the voltage in the modulator reaches a value equal to VDAC and a normal pulse width is delivered to the system. If the phase current I1 is less than the phase current I2, an offset is subtracted from VDAC, and the pulse width for channel 1 is shortened, thereby reducing the current in the first channel. If the current I1 is greater than the current I2, a longer pulse is produced. Because the increase in pulse width is proportional to the difference between the actual phase current and the ideal current, the system converges smoothly to equilibrium. Because filtering is lighter than conventional current sharing schemes, the settling time is very fast. This speed increase will be advantageous as processor speeds increase. The construct of the above systems further provide rapid dynamic current and output voltage changes while maintaining current balance.

In view of the foregoing examples, it will be appreciated that the approach shown and described herein provides a solution of unconditionally stable current sharing loop that can be implemented into any multi-phase converter. Having the small-signal transfer function model of the current-sharing loop provides a high degree of confidence in the current sharing performance. Because the loop can be integrated means that no external pins or components are required, and no user calculations are required to provide the stable current sharing. This invention allows rapid dynamic current and output voltage changes while maintaining current balance. As a result, the approach translates to an inexpensive, small, and easy-to-use solution that affords desirable performance for multi-phase systems.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A converter for a multi-phase current network, comprising:
   a plurality of current sensors, each of the plurality of current sensors being configured to detect current for a respective phase of the multi-phase network for regulating current therein;
   current averaging circuitry coupled to an output of each of the current sensors and utilizing a path for detecting current in each of the phases for generating an indication of the average current for the multi-phase network based on the current detected by each of the plurality of current sensors, whereby the current regulation and current sharing utilize a common path;
   a modulator configured to modulate at least one phase of the multi-phase network independently of each other phase of the multi-phase network based on a difference between the current detected for the at least one phase and the average current for the multi-phase network;
   a current share amplifier for each of the plurality of phases configured to provide a scaled output having a value that is proportional to the difference between the current detected for each respective phase and the average current for the multi-phase network, the modulator being configured to modulate each phase of the multi-phase network independently based on the scaled output provided for each respective phase; and
   a time-averaging filter coupled between the current sensor and the current share amplifier for each respective phase for providing a time-averaged indication of the phase current to the current share amplifier and to the current averaging circuitry.

2. The converter of claim 1, wherein the current share amplifier has a gain factor configured to scale the scaled output that is provided to the modulator.

3. The converter of claim 1, wherein the modulator is configured to modulate an ON-time for each phase independently according the scaled output for each phase of the multi-phase network.

4. The converter of claim 1, wherein the modulator further comprises a separate modulator for each of the plurality of phases, each of the modulators operating in synchronization for modulating an ON-time for each phase independently according the scaled output for each phase of the multi-phase network.

5. The converter of claim 1, further comprising a multiplexer for selectively providing the scaled output for each of the plurality of phases to the modulator so that an ON-time for each phase is modulated independently and in synchronization out of phase with each of the other phases.

6. The converter of claim 1, wherein the current share amplifier for each phase of the multi-phase network receives a signal corresponding to the current detected for each respective phase and is configured with a gain factor to provide the scaled output that is proportional to the difference between the current detected for each respective phase and the average current for the multi-phase network, whereby the current share amplifier for each phase of the multi-phase network is configured to include the current averaging circuitry.

7. The converter of claim 1, wherein at least the plurality of current sensors, the current averaging circuitry and the modulator reside in the same integrated circuit chip.

8. A converter for balancing current among different channels of a multi-phase network, comprising:
- a first current sensor for sensing current through an inductor of a first phase of the multi-phase network and for providing a first current signal representing the current through the inductor of the first phase;
- a second sensor for sensing current through an inductor of a second phase of the multi-phase network and for providing a second current signal representing the current through the inductor of the second phase;
- a first current sharing amplifier coupled to an output of the first current sensor that provides a scaled output that is proportional to a difference between an average current for the multi-phase network and the current through the inductor of the first phase;
- a second current sharing amplifier coupled to an output of the second current sensor that provides a scaled output that is proportional to a difference between an average current for the multi-phase network and the current through the inductor of the second phase, whereby current regulation and current sharing utilize a common path;
- a modulator that independently modulates an ON-time for each of first and second phases of the multi-phase network based on the scaled output provided by the first current sharing amplifier and the scaled output provided by the second current sharing amplifier; and
- a first time-averaging filter coupled between the first current sensor and the first current share amplifier for providing a time-averaged indication of the phase current to the current share amplifier.

9. The converter of claim 8, further comprising a current averaging circuit that is configured to generate an average current output signal representing average current for the multi-phase network, the first current sharing amplifier providing the scaled output based on the average current output signal and the first current signal, the second current sharing amplifier providing the scaled output based on the average current output signal and the second current signal.

10. The converter of claim 8, wherein each of the first and second current share amplifier has a predetermined gain factor to scale the scaled output that is provided to the modulator.

11. The converter of claim 8, wherein the modulator is configured to modulate an ON-time for each of the first phase and the second phase independently according the scaled output that is provided for the respective phase of the multi-phase network.

12. The converter of claim 11, wherein the modulator further comprises a separate modulator for each of the plurality of phases, each of the modulators operating in synchronization for modulating an ON-time for each phase independently according the scaled output for each phase of the multi-phase network.

13. The converter of claim 11, wherein the modulator comprises a single modulator, the converter further comprising a multiplexer for selectively providing the scaled output for each of the plurality of phases to the single modulator so that an ON-time for each phase is modulated independently and in synchronization out of phase with each of the other phases.

14. The converter of claim 8, further comprising a second time-averaging filter coupled between the second current sensor and the second current share amplifier for providing a time-averaged indication of the phase current to the current share amplifier.

15. The converter of claim 8, wherein the first current sensor, the second sensor, the first current sharing amplifier, the second current sharing amplifier and the modulator reside in a single integrated circuit.

* * * * *